March 31, 1925.                              1,531,710
W. E. McLAREN
BRAKE FOR CHILDREN'S VEHICLES
Filed Sept. 11, 1924        2 Sheets-Sheet 1

Inventor:
William E. McLaren.
By Chas. C. Tillman
Atty

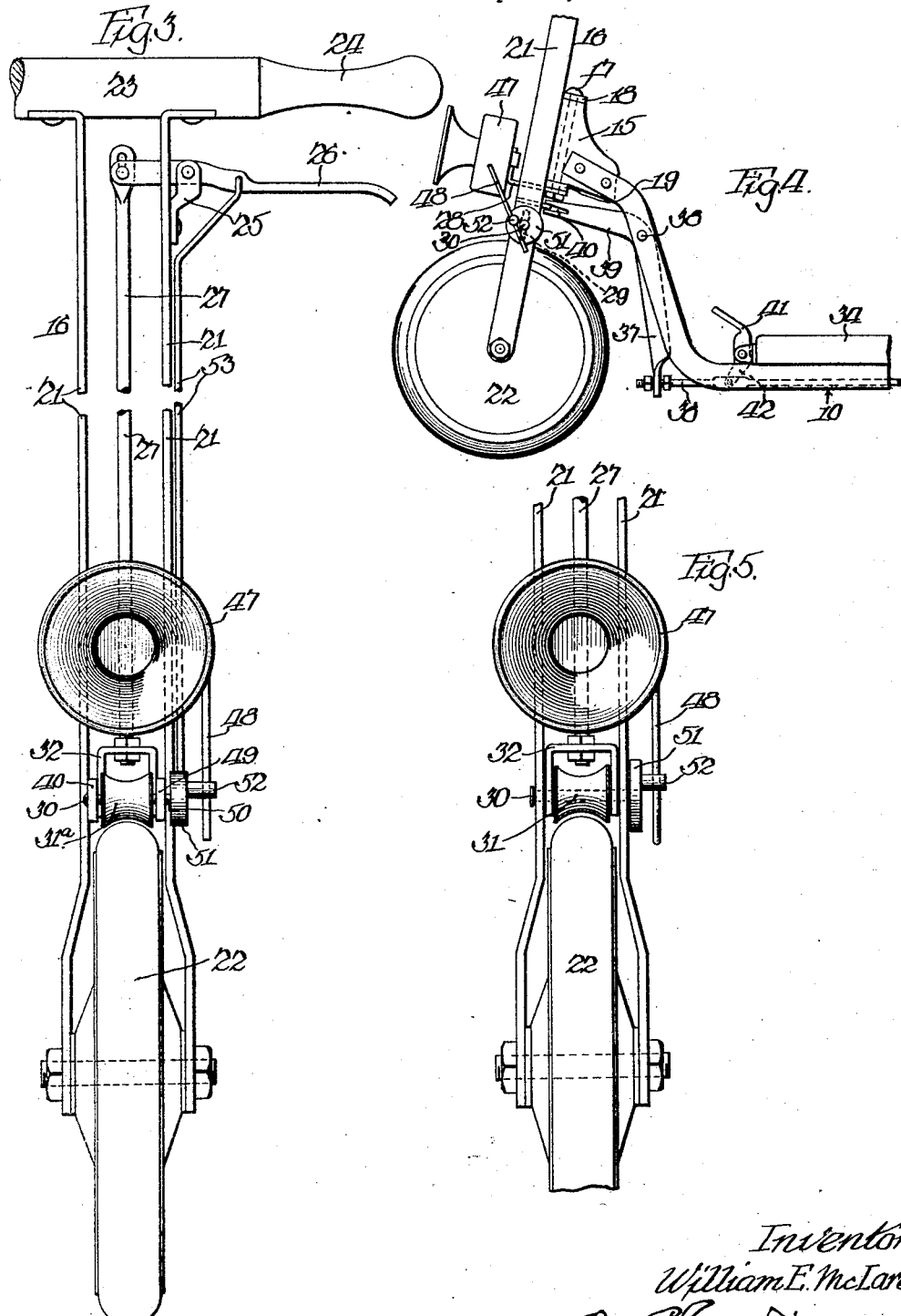

Patented Mar. 31, 1925.

1,531,710

UNITED STATES PATENT OFFICE.

WILLIAM E. McLAREN, OF LOS ANGELES, CALIFORNIA.

BRAKE FOR CHILDREN'S VEHICLES.

Application filed September 11, 1924. Serial No. 737,078.

*To all whom it may concern:*

Be it known that I, WILLIAM E. McLAREN, a citizen of the United States, residing at Los Angeles, in the county of Los Angeles and State of California, have invented certain new and useful Improvements in Brakes for Children's Vehicles, of which the following is a specification.

This invention relates, generally, to improvements in vehicle brakes, but has particular relation to that type of such brakes especially designed and intended for use in connection with children's vehicles of the "scooter" type, although not restricted in its application or use thereto, and it consists in certain peculiarities of the construction, novel arrangement and combination of the various parts thereof as will be hereinafter more fully set forth and specifically claimed.

One of the objects of the invention is, the provision in a wheeled vehicle, of braking means therefor, of such construction, arrangement and co-operation of its parts with parts of the vehicle, that said means may be applied either by hand or foot manipulation, or by both, and in such a manner as to render abrupt stoppage of the vehicle impossible, thereby avoiding the possibility of the child or user being thrown violently forward and possibly from the vehicle and injured, yet so that a gradual but positive stopping or braking action will be attained.

It is another object of the invention to combine with the brake mechanism audible signaling means which can be operated without applying the brakes.

Other objects and advantages of the invention will become apparent from the following description and explanation, which will be more readily understood when read in conjunction with the accompanying drawings, which serve to illustrate embodiments of which the invention is susceptible, it being understood that modifications and changes may be resorted to without a departure from the spirit of the invention as expressed in the appended claims forming a part hereof.

In the drawings,—

Fig. 3 is an enlarged front view in elevation showing parts shortened for the convenience of illustration.

Fig. 4 is a view in side elevation of parts of the front portion of the vehicle showing a modification in the construction of the signaling or alarm giving device.

Fig. 5 is a front face view thereof.

Corresponding numerals of reference refer to like parts throughout the different views of the drawings.

Figure 1:
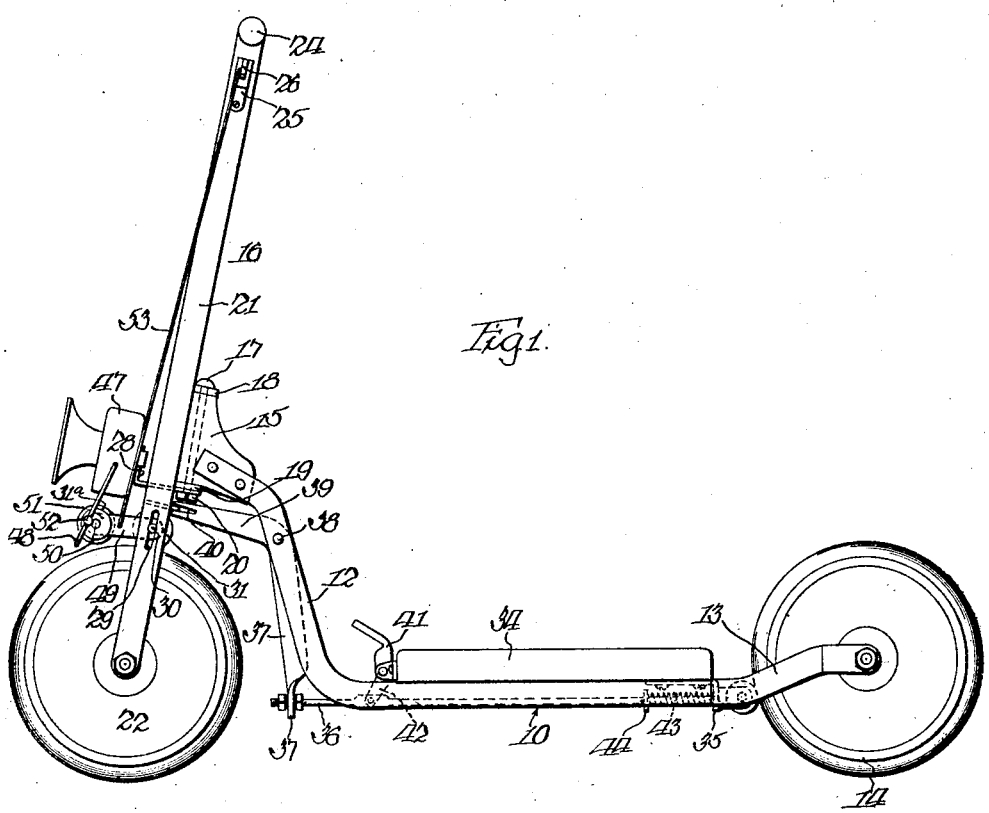
Fig. 1 is a view in side elevation of a child's vehicle of the scooter type equipped with a brake and signaling device embodying the invention.
Figure 2:
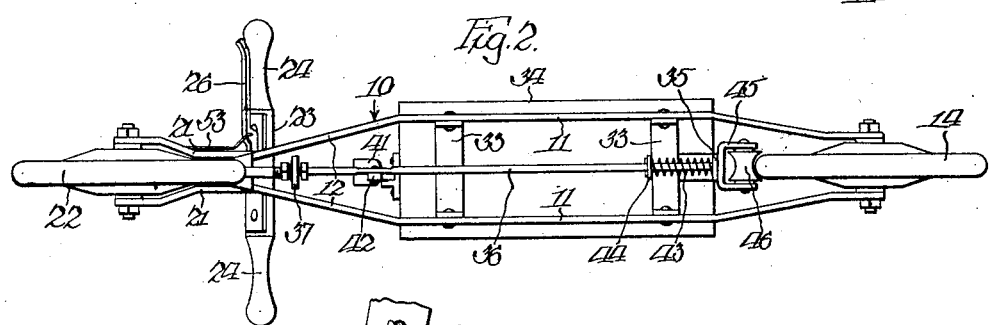
Fig. 2 is a bottom plan view thereof.
Figure 6:
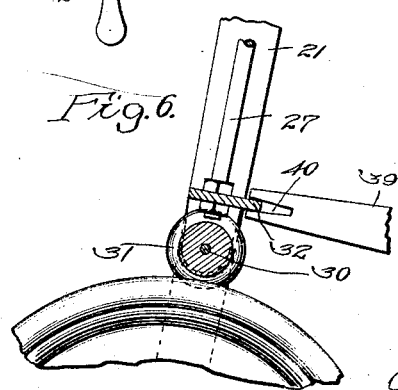
Fig. 6 is a detail view partly in section and partly in elevation of portions of the steering member, the brake shoe for the front or steering wheel, its supporting bracket, and a part of the bell crank lever used for connecting the same to the rod of the brake for the rear wheel.

Referring now more particularly to Figs. 1 to 3 inclusive, the reference numeral 10 designates as a whole the frame of the vehicle, which as shown in Figs. 1 and 2 comprises a pair of spaced parallel bars 11 which have their front portions up-turned and approximated or inclined towards each other as at 12 and their rear portions slightly up-turned or rearwardly inclined as at 13. The rear wheel 14 is suitably journaled between the rear ends of the members 11 of the frame and said wheel is by preference equipped with a rubber tire of any desired kind.

The front ends of the bars 11 of the main frame of the vehicle are secured to a head 15, which head is pivotally connected to the upright steering member designated as a whole by the numeral 16, by means of a pivot 17 extended through openings in rearwardly extended projections 18 and 19 on the steering member 16 and through a suitable opening in the head 15 which rod or bolt can be held in position by means of a nut 20 threaded on its lower portion. The steering member 16 includes a pair of parallel bars 21, see Fig. 3, which are spaced and have their lower portions downwardly and outwardly deflected, so as to stride the front wheel 22 of the vehicle and so as to embrace its hub portion, which is suitably journaled on the lower ends of the bars 21 constituting the steering member 16 of the vehicle. The wheel 22, like the wheel 14, is by preference provided with a rubber tire. The upper end of the bars 21 have transversely mounted thereon in any suitable way a handle 23 provided with a gripping portion 24 near each of its ends.

Just below the handle 23 one of the bars 21 has mounted on its outer surface an upwardly extended bracket 25 to which is pivotally secured between its ends a grip lever 26 which lies directly under the handle 23 and normally in substantial parallelism therewith. This lever has its inner portion extended through an opening in one of the bars 21 of the steering member 16 and has connected to its inner end for vertical and pivotal movement thereon the upper portion of a brake operating rod 27, see Fig. 3, which rod is extended downwardly between the bars 21 through an opening in a bracket 28 secured to the inner surfaces of the bars 21 at a suitable distance above the front wheel of the vehicle and extended forwardly of the steering member 16 and upwardly, as is clearly shown in Fig. 1 of the drawings. Just above the upper part of the front wheel 22 each of the bars 21 is provided with a vertically disposed slot 29, see Fig. 1, which slots register with one another and are for the reception and operation of a shaft or axle 30 which is transversely and horizontally disposed in said slots and has mounted thereon a spool-shaped brake shoe or element 31 for co-operation with the front wheel of the vehicle.

The shaft or axle 30 for this brake shoe or element 31 is connected to the lower end of the brake rod 27 by means of an inverted U-shaped yoke 32 held in place on said rod by means of clamping nuts or otherwise.

Mounted on the upper surface of the parallel portions of the frame 10 and their brace bars 33 which connect them together transversely, is the foot rest board 34 which has at its rear end and at about midway between the bars 11 secured to its lower surface a depending bracket 35 which has an opening for the reception and operation of a brake rod 36 located at one of its end portions in said openings and extended horizontally and longitudinally beneath the board 34. This rod has its front end loosely connected to the lower arm 37 of a bell crank lever which is fulcrumed between the upper portion of the front parts of the bars 11 of the main frame as at 38, see Fig. 1 of the drawings. The upper or shorter arm 39 of this bell crank lever has in its front end an open slot 40 to loosely engage the rear part of the horizontal portion of the U-shaped bracket 32 which carries the shaft 30 on which the brake shoe 31 for the front wheel is mounted. Pivotally mounted on the front end of the foot board 34 is a foot lever 41 which is somewhat of the form of a bell crank lever and has its lower arm or member 42 pivotally connected to the brake rod 36 near its front end.

The upper arm of the lever 41 which acts as a foot rest or pedal extends above the board 34 and is held in its normal position as shown in Fig. 1 by means of a coil spring 43 located around the rod 36 at its rear portion and has one of its ends in contact with the depending bracket 35 and its other end resting against a collar 44 fixed to the rod 36 at a suitable distance forwardly of said bracket. Mounted on the rear end of the rod 36 is a U-shaped yoke 45 between the prongs of which is rotatably located a spool-shaped brake shoe 46 to contact with the rear wheel 14 when desired.

Referring now more particularly to Figs. 1 and 3, it will be seen that the bracket 28 which extends forwardly of the steering member 16 supports an audible signaling device designated as a whole by the numeral 47, which device may be of any desired kind for producing noise or sound.

To operate the arm 48 of the device 47 so as to actuate the sound producing mechanism of said device, a pair of forwardly extended links 49 loosely mounted at their rear ends on the shaft 30, one on each side of the brake shoe 31, are employed to support a transverse shaft 50 journaled in their front portions, on which shaft is mounted for rotation therewith another brake shoe 31$^a$ to co-act with the wheel 22 and also a disk 51 which carries on its outer surface an eccentrically located wrist pin 52 which is rotatably mounted on the disk 51 and is provided with a transverse opening through which the arm 48 of the signaling device 47 is extended for slidable movement therein. Connected at one of its ends to one of the links 49 is a rod 53 which is pivotally connected at its upper end to the grip lever 26 on the opposite side of its fulcrum from that on which the brake rod 27 is connected or located. In Figs. 4 and 5 is shown a modification in the construction of the means for operating the signaling device 47 which consists in dispensing with the links 49 employed for supporting the disk 51 as shown in Figs. 1 and 3 and just above described, and in mounting the disk 51 directly upon one end of the shaft 30 of the brake shoe 31 for the front wheel of the vehicle. Otherwise, the construction and arrangement of the various parts of the device are the same as shown in Figs. 1 to 3 inclusive and above described, except that in the modification shown in Figs. 4 and 5 the rod 53 is also dispensed with.

From the foregoing and by reference to the drawings, it will be readily understood and clearly seen that when it is desired to apply the brakes, it is only necessary to raise the free end of the gripping lever 26, which operation, through the instrumentality of the brake rod 27 and yoke 32 will force the brake shoe 31 into contact with the front wheel and as the upper arm 39 of the bell crank lever is connected to the yoke 32, it is evident that in the downward movement of said yoke, said arm will be depressed, thus causing the other arm 37 of said lever to force by means of the rod 36 the brake shoe 46 into contact with the rear wheel of the vehicle, thus applying pressure to each of the wheels at the same time. When it is desired to release the brakes, all that is necessary is to remove upward pressure from the gripping lever 26, when the parts of the brake mechanism will be caused to assume their normal positions by reason of the action of the spring 43 on the rod 36. When it is desired to operate the brakes by means of foot power, it is evident that by placing the foot on the lever 41 and pressing it forwardly, the same movement of the parts for setting the brakes as that accomplished by lifting the gripping lever will be performed.

When the construction of the signaling mechanism shown in Figs. 1 to 3 inclusive is employed, and it is desired to operate the signaling device, the gripping lever 26 is forced downwardly at its free end, which operation will cause the brake shoe 31ª through the rod 53 to be depressed into contact with the wheel 22 in the rotation of which said spool and the wrist pin 52 will be rotated, thus causing vibratory movement of the arm 48 and through it actuation of the noise or sound producing mechanism within the casing of the signaling device.

When the modified form shown in Figs. 4 and 5 is employed, it is manifest that the signaling device will be operated simultaneously with the application of the brake shoes.

By my improvements a very simple, inexpensive, and efficient brake and signaling apparatus is provided, in which the user may apply braking pressure to both of the wheels of the vehicle is such a way that the abrupt stoppage of the vehicle will be avoided, yet a gradual stoppage therefor will be effected. It will be understood that the yokes 32 and 45 which carry the brake shoes 31 and 46 respectively are adjustably mounted on the brake rods 27 and 36 respectively so that said brake shoes can be adjusted to compensate for wear of the tires of the wheels with which they co-act.

I claim—

1. In a device of the class described, the combination with a tandem wheeled main frame, of a vertically disposed steering member rotatably connected to its front portion, the front one of said wheels journaled on the lower portion of said member, a lever fulcrumed on the upper portion of said member, a rod carried by the steering member for vertical movement and connected at its upper end to said lever, a brake shoe mounted on the lower portion of said rod for detachable engagement with the steering wheel, a spring-actuated rod mounted on the main frame for longitudinal movement with respect thereto, a brake shoe mounted on the rear portion of the last named rod for detachable engagement with the wheel on the rear part of the main frame, and a vertically disposed bell crank lever fulcrumed on the front part of the said frame and having loose connection at its ends with said brake shoe carrying rods.

2. In a device of the class described, the combination with a tandem wheeled main frame, of a vertically disposed steering member rotatably connected to its front portion, the front one of said wheels journaled on the lower portion of said member, a lever fulcrumed on the upper portion of said member, a rod carried by the steering member for vertical movement and connected at its upper end to said lever, a brake shoe mounted on the lower portion of said rod for detachable engagement with the steering wheel, a spring-actuated rod mounted on the main frame for longitudinal movement with respect thereto, a brake shoe mounted on the rear portion of the last named rod for detachable engagement with the wheel on the rear part of the main frame, a vertically disposed bell crank lever fulcrumed on the front part of said frame and having loose connection at its ends with said brake shoe carrying rods, and a foot lever fulcrumed on the main frame and pivotally connected to said horizontal rod.

3. In a device of the class described, the combination with a wheeled main frame, of a vertically disposed steering member rotatably connected to its front end, one of the wheels of said frame journaled on the lower portion of said member, a lever fulcrumed on the upper portion of said member, a rod carried by the steering member for vertical movement and connected at one of its ends to said lever, a rotatable brake shoe adjustably mounted on the lower portion of said rod for detachable engagement with the steering wheel, a spring-actuated rod horizontally mounted on the main frame for longitudinal movement with respect thereto, a rotatable brake shoe adjustably mounted on the rear portion of the last named rod for detachable engagement with a wheel on the rear part of the main frame, and a vertically disposed bell crank lever fulcrumed on the front part of said frame and having loose connection at its ends with said brake shoe carrying rods.

4. In a device of the class described, the combination with a wheeled main frame, of a vertically disposed steering member rotatably connected to its front end, one of the wheels of said frame journaled on the lower portion of said member, a lever fulcrumed on the upper portion of said member, a rod carried by the steering member for vertical movement and connected at one of its ends to said lever, a rotatable brake shoe adjustably mounted on the lower portion of said rod for detachable engagement with the steering wheel, a spring-actuated rod horizontally mounted on the main frame for longitudinal movement with respect thereto, a rotatable brake shoe adjustably mounted on the rear portion of the last named rod for detachable engagement with a wheel on the rear part of the main frame, a vertically disposed bell crank lever fulcrumed on the front part of said frame and having loose connection at its ends with said brake shoe carrying rods, and a foot lever fulcrumed on the front portion of the main frame and pivotally connected to said horizontal rod.

5. In a device of the class described, the combination with a wheeled main frame, of a vertically disposed steering member rotatably connected to its front portion, one of the wheels of said frame journaled on the lower part of said member, a lever fulcrumed on the upper portion of said member, a rod carried by the steering member for vertical movement and loosely connected at its upper end to said lever on one side of its fulcrum, a brake shoe on the lower portion of said rod for detachable engagement with the steering wheel, an audible signaling device mounted on the steering member to turn therewith, a pair of spaced links pivotally and movably mounted at one of their ends on the steering member below said signaling device and extended forwardly thereof, a roller or brake shoe journaled on the front portion of said links, a disk fixed on the journal of the last named roller or brake shoe and having a transversely orificed wrist pin eccentrically and rotatably mounted on its face, an arm loosely extended through the opening of said pin and operatively connected to said signaling device, a rod pivotally connected at its lower end to one end of said links and at its upper end to the brake rod actuating lever on the opposite side of its fulcrum from that to which the said brake rod is connected.

WILLIAM E. McLAREN.